(12) United States Patent
Wu

(10) Patent No.: US 11,719,835 B2
(45) Date of Patent: Aug. 8, 2023

(54) RADIATION-SENSING DEVICE

(71) Applicant: InnoCare Optoelectronics Corporation, Tainan (TW)

(72) Inventor: Chih-Hao Wu, Miao-Li County (TW)

(73) Assignee: InnoCare Optoelectronics Corporation, Tainan (TW)

( * ) Notice: Subject to any disclaimer, the term of this patent is extended or adjusted under 35 U.S.C. 154(b) by 397 days.

(21) Appl. No.: 16/885,652

(22) Filed: May 28, 2020

(65) Prior Publication Data

US 2020/0386900 A1 Dec. 10, 2020

(30) Foreign Application Priority Data

Jun. 10, 2019 (CN) .......................... 201910496481.2

(51) Int. Cl.
*G01T 1/20* (2006.01)
*G01T 1/208* (2006.01)

(52) U.S. Cl.
CPC .......... *G01T 1/20181* (2020.05); *G01T 1/208* (2013.01); *G01T 1/2019* (2020.05); *G01T 1/20186* (2020.05); *G01T 1/20187* (2020.05)

(58) Field of Classification Search
CPC ............. G01T 1/20181; G01T 1/20186; G01T 1/20187; G01T 1/2019; G01T 1/208; G01T 1/164
See application file for complete search history.

(56) References Cited

U.S. PATENT DOCUMENTS

| 5,420,429 A * | 5/1995 | Eberhard ................ B06B 1/064 |
| | | 250/370.11 |
| 6,895,077 B2 * | 5/2005 | Karellas ................... H04N 5/32 |
| | | 378/98.12 |

(Continued)

FOREIGN PATENT DOCUMENTS

| CN | 107407735 A | 11/2017 |
| JP | 2012182346 A * | 9/2012 |

(Continued)

OTHER PUBLICATIONS

Patent Translate of WO2019097847A1 (Year: 2019).*

(Continued)

*Primary Examiner* — David P Porta
*Assistant Examiner* — Djura Malevic
(74) *Attorney, Agent, or Firm* — JCIPRNET

(57) ABSTRACT

A radiation-sensing device is provided. The radiation-sensing device includes a substrate, a first scintillator layer, a second scintillator layer, and an array layer. The first scintillator is disposed on a first side of the substrate, and includes a plurality of first blocking walls and a plurality of first scintillator elements. The plurality of first scintillator elements are located between the plurality of first blocking walls. The second scintillator layer is disposed on a second side of the substrate, and the second side is opposite to the first side. The array layer is located between the first scintillator layer and the second scintillator layer, and has a plurality of photosensitive elements. In addition, a projection of at least one of the plurality of first blocking walls on the substrate overlaps with a projection of at least one of the plurality of photosensitive elements on the substrate.

14 Claims, 12 Drawing Sheets

(56) References Cited

U.S. PATENT DOCUMENTS

| | | | | |
|---|---|---|---|---|
| 7,009,646 | B1* | 3/2006 | Fossum | H01L 27/14601 348/E3.032 |
| 7,427,749 | B2* | 9/2008 | Spahn | H04N 5/32 348/E5.079 |
| 7,435,965 | B2* | 10/2008 | Fuchs | G01T 1/2018 250/370.11 |
| 7,450,683 | B2* | 11/2008 | Tkaczyk | A61B 6/032 378/19 |
| 7,569,832 | B2* | 8/2009 | Tredwell | H01L 27/14632 250/370.11 |
| 7,696,481 | B2* | 4/2010 | Tkaczyk | G01T 1/2985 250/363.02 |
| 7,885,372 | B2* | 2/2011 | Edie | G01N 23/046 378/19 |
| 7,968,853 | B2* | 6/2011 | Altman | A61B 6/032 250/366 |
| 8,586,933 | B2* | 11/2013 | Levene | G01T 1/2018 250/366 |
| 8,809,794 | B2* | 8/2014 | Uchida | G01T 1/2006 250/361 R |
| 8,835,860 | B2* | 9/2014 | Wu | G01T 1/2018 250/366 |
| 8,912,499 | B2* | 12/2014 | Asagiri | G01T 1/2985 250/370.11 |
| 9,182,504 | B2* | 11/2015 | Nishino | G01T 1/2018 |
| 9,194,963 | B2* | 11/2015 | Myung | G01T 1/1642 |
| 9,422,159 | B2* | 8/2016 | Colby | B82Y 20/00 |
| 9,435,898 | B2* | 9/2016 | Olcott | A61B 6/508 |
| 9,793,305 | B2* | 10/2017 | Tajima | H05G 1/28 |
| 10,132,939 | B2* | 11/2018 | Adachi | G01T 1/20 |
| 10,459,094 | B2* | 10/2019 | Simanovsky | G01T 1/2018 |
| 10,488,532 | B2* | 11/2019 | Abenaim | G01T 1/2018 |
| 10,677,938 | B2* | 6/2020 | Onishi | G01T 1/244 |
| 10,739,473 | B2* | 8/2020 | Baturin | A61B 6/5235 |
| 11,099,283 | B2* | 8/2021 | Yamaji | G01T 1/2018 |
| 11,156,727 | B2* | 10/2021 | Shedlock | G01T 1/2018 |
| 11,253,212 | B2* | 2/2022 | Jacob | A61B 6/4283 |
| 11,340,359 | B2* | 5/2022 | Herrmann | G01T 1/2018 |
| 2004/0178349 | A1* | 9/2004 | Kameshima | H04N 5/32 348/E5.079 |
| 2004/0200971 | A1* | 10/2004 | De Keyser | G01N 23/04 378/98.8 |
| 2006/0067472 | A1* | 3/2006 | Possin | H05G 1/265 378/98.9 |
| 2007/0069111 | A1* | 3/2007 | Spahn | H01L 27/14663 250/370.11 |
| 2008/0245968 | A1* | 10/2008 | Tredwell | H01L 27/14632 250/370.09 |
| 2010/0270462 | A1* | 10/2010 | Nelson | G01T 1/2018 250/252.1 |
| 2011/0017918 | A1* | 1/2011 | Baeumer | G01T 1/2018 250/370.11 |
| 2011/0233415 | A1* | 9/2011 | Nakatsugawa | G01T 1/2985 250/370.08 |
| 2011/0303849 | A1* | 12/2011 | Tredwell | G01T 1/2018 250/362 |
| 2013/0026373 | A1* | 1/2013 | Wu | G01T 1/2018 250/366 |
| 2013/0126850 | A1* | 5/2013 | Iwakiri | H01L 51/42 257/53 |
| 2013/0292574 | A1* | 11/2013 | Levene | G01T 1/362 250/362 |
| 2015/0185334 | A1* | 7/2015 | Tredwell | G01T 1/161 250/361 R |
| 2016/0274249 | A1* | 9/2016 | Vogtmeier | A61B 6/4447 |
| 2016/0363673 | A1* | 12/2016 | Ahn | H01L 27/14663 |
| 2017/0059721 | A1* | 3/2017 | Simanovsky | G01T 1/243 |
| 2017/0097425 | A1* | 4/2017 | Shedlock | G01T 1/2002 |
| 2017/0168169 | A1* | 6/2017 | Liu | A61B 6/03 |
| 2018/0052240 | A1 | 2/2018 | Tanabe et al. | |
| 2019/0120977 | A1* | 4/2019 | Jacobs | G01T 1/2018 |
| 2019/0353802 | A1* | 11/2019 | Steinhauser | H01L 27/14621 |
| 2020/0209412 | A1 | 7/2020 | Inoue | |

FOREIGN PATENT DOCUMENTS

| | | |
|---|---|---|
| WO | 2017/059086 A1 | 4/2017 |
| WO | 2017202738 | 11/2017 |
| WO | 2018/122213 A1 | 7/2018 |
| WO | 2018202465 | 11/2018 |
| WO | 2019/054351 A1 | 3/2019 |
| WO | 2019/097847 A1 | 5/2019 |

OTHER PUBLICATIONS

English Translation of JP-2012182346-A (Year: 2012).*
European Search Report dated Sep. 18, 2020, issued in application No. EP 20179042.5.
"Office Action of Europe Counterpart Application", dated Sep. 2, 2022, p. 1-p. 8.

* cited by examiner

RADIATION-SENSING DEVICE

CROSS REFERENCE TO RELATED APPLICATIONS

This application claims priority of Chinese Patent Application 201910496481.2, filed on Jun. 10, 2019 the entirety of which is incorporated by reference herein.

BACKGROUND

Technical Field

The present disclosure relates to a radiation-sensing device, and in particular it relates to a radiation-sensing device having a blocking wall structure or a light-shielding structure.

Description of the Related Art

Sensing devices are widely used in various electronic devices. Among them, radiation-sensing devices are widely used in medical diagnostic assisting tools in the forensic sciences. For example, a radiation-sensing device can be applied to the radiography of chest, breast, or the cardiovascular system.

Current radiographic technology often uses dual-energy imaging technology to obtain a clear image. This technology requires continuous exposure of high-energy and low-energy radiation (such as X-rays) to the human body, and image processing is performed on the images obtained by these two different energies. However, if the human body is moved during the two exposures of radiations, it will result in blurred images.

The current solution includes placing two X-ray array panels in the same radiation flat panel detector, and simultaneously obtaining high-energy and low-energy images in one radiation exposure. However, as a result, the overall thickness and weight of the radiation flat panel detector will increase, and the manufacturing cost will also go up significantly.

Therefore, the development of a structural design that can further improve the performance of a radiation-sensing device is still one of the current goals of the industry.

SUMMARY

In accordance with some embodiments of the present disclosure, a radiation-sensing device is provided. The radiation-sensing device includes a substrate, a first scintillator layer, a second scintillator layer, and an array layer. The first scintillator is disposed on a first side of the substrate, and includes a plurality of first blocking walls and a plurality of first scintillator elements. The plurality of first scintillator elements are located between the plurality of first blocking walls. The second scintillator layer is disposed on a second side of the substrate, and the second side is opposite to the first side. The array layer is located between the first scintillator layer and the second scintillator layer, and has a plurality of photosensitive elements. In addition, a projection of at least one of the plurality of first blocking walls on the substrate overlaps with a projection of at least one of the plurality of photosensitive elements on the substrate.

In accordance with some embodiments of the present disclosure, a radiation-sensing device is provided. The radiation-sensing device includes a substrate, a first scintillator layer, a second scintillator layer, and an array layer. The first scintillator layer is disposed on a first side of the substrate. The second scintillator layer is disposed on a second side of the substrate, and the second side is opposite to the first side. The array layer is located between the first scintillator layer and the second scintillator layer. The array layer has a plurality of photosensitive elements and at least one light-shielding element. In addition, a projection of the at least one light-shielding element on the substrate overlaps with a projection of at least one of the plurality of photosensitive elements on the substrate.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
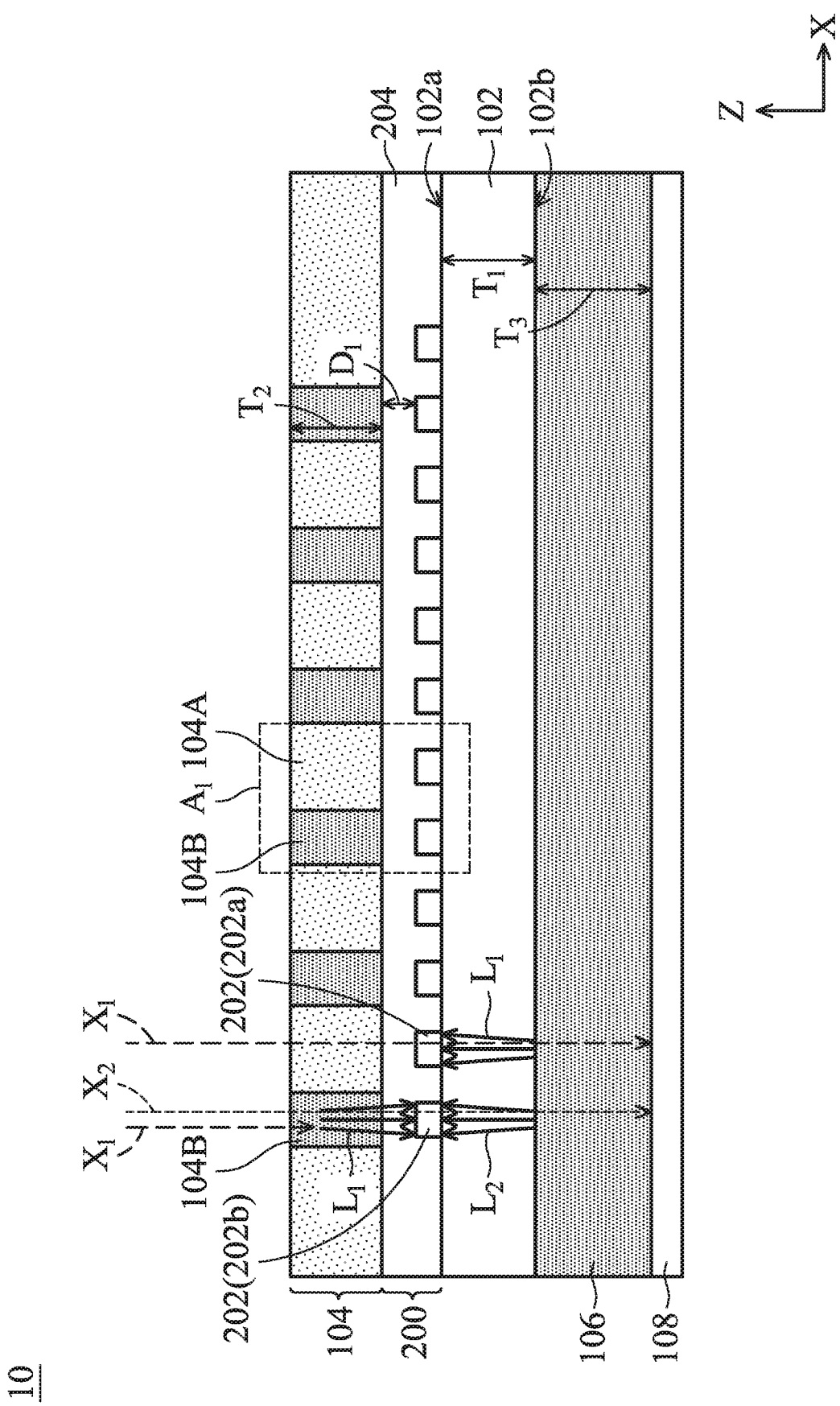
FIG. 1A is a schematic cross-sectional structure diagram of a radiation-sensing device in accordance with some embodiments of the present disclosure.

The structure of a radiation-sensing device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent that the exemplary embodiments set forth herein are used merely for the purpose of illustration and the present disclosure is not limited thereto. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that the elements or devices in the drawings of the present disclosure may be present in any form or configuration known to those with ordinary skill in the art. In addition, relative terms such as "lower" or "bottom" or "higher" or "top" may be used in the embodiments to describe the relative relationship between one element and another element in the figure. It can be understood that if the illustrated device is flipped upside down, the element described on the "lower" side will become the element on the "higher" side. The embodiments of the disclosure can be understood together with the drawings, and the drawings of the disclosure are also considered as a part of the disclosure description. It should be understood that the drawings are not drawn to scale. In fact, the size of the elements may be arbitrarily enlarged or reduced in order to clearly present the features of the present disclosure.

In addition, it should be understood that, although the terms "first", "second", "third" etc. may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

In the context, the terms "about", "approximately", "substantially", "generally" typically mean +/−10% of the stated value, or +/−5% of the stated value, or +/−3% of the stated value, or +/−2% of the stated value, or +/−1% of the stated value, or +/−0.5% of the stated value. The stated value of the present disclosure is an approximate value. When there is no specific description, the stated value includes the meaning of "about", "approximately", "substantially", "generally". In addition, the terms "the range is from the first value to the second value" and "the range is between the first value and the second value" means that the range includes the first value, the second value, and other values between them.

In some embodiments of the present disclosure, the terms concerning attachments, coupling and the like, such as "connecting" and "interconnecting" may refer to the two structures being in direct contact, or may refer to the two structures not being in direct contact and there may be other structures disposed between the two structures, unless specifically defined. Moreover, the term concerning connecting and interconnecting may also include a case where both structures are movable or both structures are fixed.

It should be understood that when an element or layer is referred to as being "on" or "connected to" another element or layer, it can be directly on the other element or layer or directly connected to another element or layer. One element or layer is connected, or there may be intervening elements or layers. On the contrary, when an element is referred to as being "directly on" or "directly" connected to another element or layer, there are no intervening elements present.

Unless otherwise defined, all terms (including technical and scientific terms) used herein have the same meaning as commonly understood by one of ordinary skill in the art to which this disclosure belongs. It can be understood that these terms, such as those defined in commonly used dictionaries, should be interpreted to have a meaning consistent with the relevant technology and the background or context of this disclosure, and should not be interpreted in an idealized or overly formal manner. Unless specifically defined in the disclosed embodiments.

In accordance with some embodiments of the present disclosure, a radiation-sensing device is provided, and the radiation-sensing device includes a pixelated scintillator layer or a light-shielding element that is disposed corresponding to parts of the light-sensitive elements. Accordingly, in cases where one radiation array panel is used, clear images of high energy and low energy can be obtained in one radiation irradiation after image processing.

Refer to FIG. 1A, which is a schematic cross-sectional structure diagram of a radiation-sensing device 10 in accordance with some embodiments of the present disclosure. It should be understood that, for clear description, FIG. 1A only illustrates some components of the radiation-sensing device 10, and the detailed structures of some components will be further described in subsequent drawings. In addition, in accordance with some embodiments, additional features may be added to the radiation-sensing device 10 described below. In accordance with some embodiments, the radiation-sensing device 10 may include an X-ray sensing device, but it is not limited thereto.

As shown in FIG. 1A, the radiation-sensing device 10 includes a substrate 102. The substrate 102 may have a first side 102a and a second side 102b opposite to the first side 102a, that is, the second side 102b is opposing to the first side 102a. The substrate 102 may have a first thickness $T_1$. In some embodiments, the first thickness $T_1$ may be in a range from about 1 micrometer (μm) to about 200 or from about 5 μm to about 80 but it is not limited thereto. For example, the first thickness $T_1$ may be 10 μm, 20 μm, 30 μm, 40 μm, 50 μm, 60 μm, or 70 μm.

In addition, in accordance with embodiments of the present disclosure, the first thickness $T_1$ of the substrate 102 refers to its maximum thickness in a normal direction of the substrate 102 (for example, the Z direction shown in the figure).

In some embodiments, the substrate 102 includes a rigid material or a flexible material. For example, in some embodiments, the material of the substrate 102 may include polycarbonate (PC), polyimide (PI), polyethylene terephthalate (PET), rubber, glass fiber, other suitable materials, or a combination thereof, but it is not limited thereto. In some embodiments, the substrate 102 may include a metal-glass fiber composite plate or a printed circuit board, but it is not limited thereto.

Furthermore, the radiation-sensing device 10 includes a first scintillator layer 104, and the first scintillator layer 104 may be disposed on the first side 102a of the substrate 102. Specifically, in accordance with some embodiments, the first scintillator layer 104 may convert lower-energy radiation (such as the dotted line shown in the figure, radiation $X_1$) into visible light (such as the solid line shown in the figure, visible light $L_1$).

As shown in FIG. 1A, in some embodiments, the first scintillator layer 104 may include a plurality of first blocking walls 104A and a plurality of first scintillator elements 104B, and the first scintillator element 104B may be located between the blocking walls 104A. In other words, in accordance with some embodiments, the first scintillator layer 104 is pixelated, in which the first blocking wall 104A and the first scintillator element 104B are spaced from each other (disposed alternately).

In some embodiments, a physical vapor deposition (PVD) process, a chemical vapor deposition (CVD) process, a coating process, another suitable process, or a combination thereof may be used to form the first blocking wall 104A and the first scintillator element 104B. The physical vapor deposition process may include, for example, a sputtering process, an evaporation process, or a pulsed laser deposition. The chemical vapor deposition process may include, for example, a low pressure chemical vapor deposition (LPCVD) process, a low temperature chemical vapor deposition (LTCVD) process, a rapid thermal chemical vapor deposition (RTCVD) process, and a plasma-enhanced chemical vapor deposition (PECVD) process, or an atomic layer deposition (ALD) process.

In some embodiments, the pixelated first scintillator layer 104 may be formed by a patterning process. The patterning process may include a photolithography process and an etching process. The photolithography process may include, but is not limited to, photoresist coating (such as spin coating), soft baking, hard baking, mask alignment, exposure, post-exposure baking, photoresist development, cleaning and drying. The etching process may include a dry etching process or a wet etching process, but it is not limited thereto.

In some embodiments, the first blocking wall 104A may include a reflective material, air, or a combination thereof. In other words, in some embodiments, the first blocking wall 104A is substantially not existed. In some other embodiments, the reflective material of the first blocking wall 104A may include a material having a high reflectivity (e.g., greater than 90%). In some embodiments, the reflective material of the first blocking wall 104A may include a matrix and high reflection coefficient particles dispersed in the matrix, but it is not limited thereto. In some embodiments, the matrix may include organic resin, glass paste, other suitable materials, or a combination thereof, but it is not limited thereto. In some embodiments, the material of the high reflection coefficient particles may include silver (Ag), aluminum (Al), titanium (Ti), titanium dioxide ($TiO_2$), niobium-doped titanium oxide (TNO), zinc oxide (ZnO), zirconium dioxide ($ZrO_2$), or a combination thereof, but it is not limited thereto. In some embodiments, a coating of the material of the aforementioned high reflection coefficient particles can also be used as the first blocking wall 104A.

On the other hand, the first scintillator element 104B may be formed of a material with radiation-converting properties. In some embodiments, the material of the first scintillator element 104B may include cesium iodide (CsI), sodium iodide (NaI), thallium iodide (TlI), gadolinium disulfide ($Gd_2O_2S$), other suitable materials, or a combination thereof, but it is not limited thereto. In addition, the radiation-sensing device 10 includes a second scintillator layer 106, and the second scintillator layer 106 may be disposed on the second side 102b of the substrate 102. It should be understood that only one set of radiation (radiation $X_1$ and $X_2$) and visible light (visible light $L_1$ and $L_2$) are illustrated in the figure as examples. In fact, each of the photosensitive elements 202 may have corresponding radiation and/or visible light around it. In accordance with some embodiments, the second scintillator layer 106 may convert the radiation that passes through the first scintillator element 104B without being absorbed due to the higher energy (such as the dotted line shown in the figure, the radiation $X_2$) into visible light (such as the solid line shown in the figure, the visible light $L_2$). In addition, in accordance with some embodiments, the second scintillator layer 106 may also convert the radiation that passes through the first blocking wall 104A of the first scintillator layer 104 without being absorbed (such as the radiation $X_1$) into visible light (such as the visible light $L_1$). As shown in FIG. 1A, in some embodiments, the second scintillator layer 106 may be an unpixelated layer.

The second scintillator layer 106 may be formed of a material with radiation-converting properties. In some embodiments, the material of the second scintillator layer 106 may include cesium iodide (CsI), sodium iodide (NaI), thorium iodide (TlI), gadolinium disulfide ($Gd_2O_2S$), other suitable materials, or a combination thereof, but it is not limited thereto. In some embodiments, the material of the first scintillator element 104B may be the same as or different from the material of the second scintillator layer 106.

In some embodiments, the foregoing physical vapor deposition (PVD) process, chemical vapor deposition (CVD) process, coating process, other suitable process, or a combination thereof may be used to form the second scintillator layer 106.

In addition, the first scintillator layer 104 (or the first scintillator element 104B) has a second thickness $T_2$, and the second scintillator layer 106 has a third thickness $T_3$. In some embodiments, the third thickness $T_3$ of the second scintillator layer 106 may be greater than or equal to the second thickness $T_2$ of the first scintillator element 104B. In some embodiments, the ratio of the third thickness $T_3$ to the second thickness $T_2$ may be in a range from 0.5:1 to 5:1, or from 2:1 to 4:1, for example, 3:1, but it is not limited thereto.

Furthermore, in accordance with embodiments of the present disclosure, the second thickness $T_2$ of the first scintillator layer 104 (or the first scintillator element 104B) or the third thickness $T_3$ of the second scintillator layer 106 refers to its maximum thickness in the normal direction of the substrate 102 (for example, the Z direction shown in the figure).

It should be understood that the actual thicknesses of the first scintillator layer 104 and the second scintillator layer 106 can be adjusted according to the wavelength or energy range of the radiation to be absorbed or converted. Generally, the larger the thickness of the scintillator layer is, the higher the energy of the radiation it can absorb.

Figure 4B:
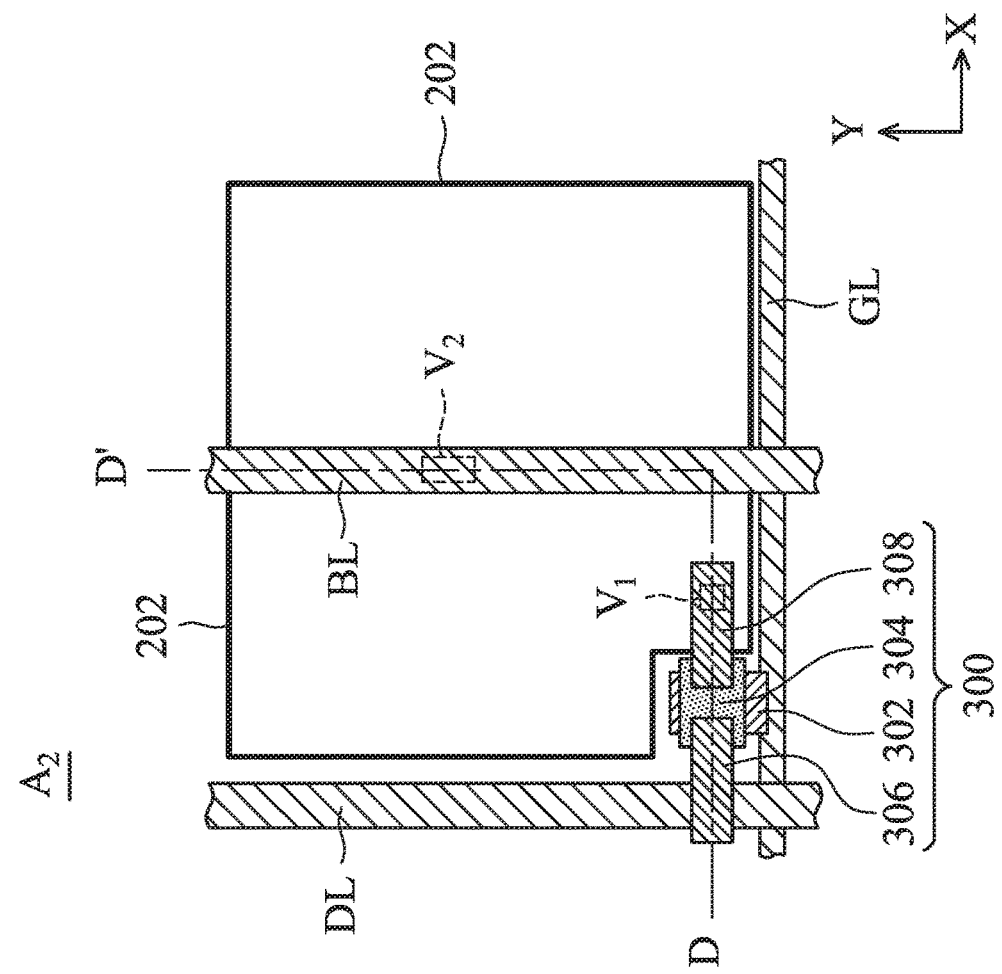
FIG. 4B is a schematic top-view structure diagram of a local array layer in accordance with some embodiments of the present disclosure.

In addition, the radiation-sensing device 10 further includes an array layer 200. The array layer 200 is located between the first scintillator layer 104 and the second scintillator layer 106, and the array layer 200 may have a plurality of photosensitive elements 202. In some embodiments, the photosensitive elements 202 is disposed on the substrate 102 and is located on the first side 102a of the substrate 102, that is, the photosensitive element 202 and the first scintillator layer 104 are located on the same side of the substrate 102. In accordance with some embodiments, the array layer 200 may be disposed on the first side 102a or the second side 102b of the substrate 102. In some embodiments, the photosensitive element 202 may include a photodiode, but it is not limited thereto. In accordance with some embodiments, the radiation-sensing device 10 may be, for example, an X-ray sensing device. For example, a photodiode can convert the visible light that is generated by the conversion of the first scintillator layer 104 or the second scintillator layer 106 into an electric charge, store it in a sensing pixel, and then the corresponding electric charge can be read through the turn on or turn off of a driving element 300 (for example, as shown in FIG. 4C), and the electric charge data is generated and converted it into a digital image through calculation.

In some embodiments, a part of the photosensitive elements 202 may be disposed corresponding to the first blocking walls 104A. In other words, in some embodiments, in the normal direction of the substrate 102 (for example, the Z direction shown in the figure), a part of the photosensitive elements 202 (for example, the photosensitive element labeled 202a in the figure) may overlap with the first blocking walls 104A.

Figure 1B:
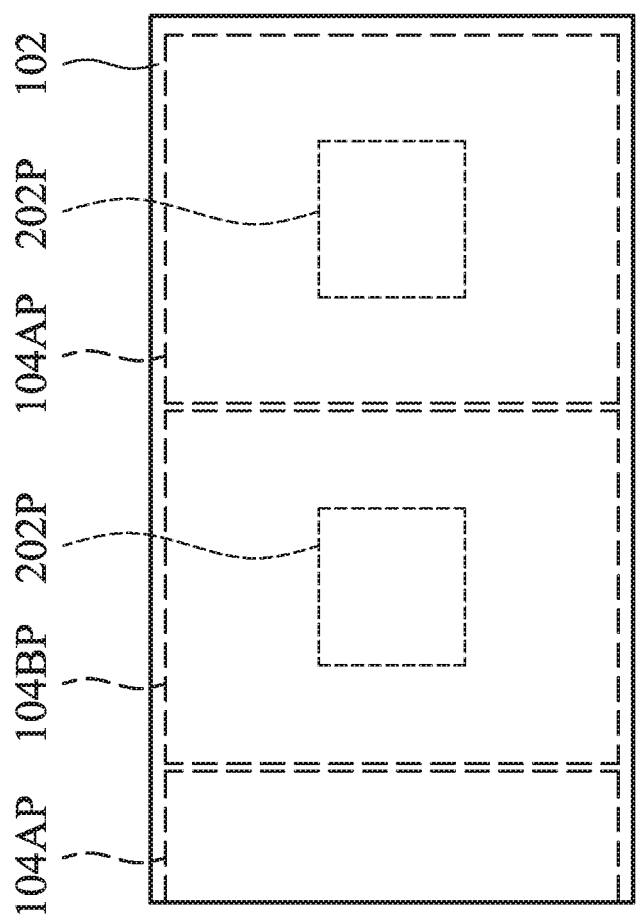
FIG. 1B is a schematic diagram showing projection areas of some elements of a radiation-sensing device in accordance with some embodiments of the present disclosure.
Figure 1B:
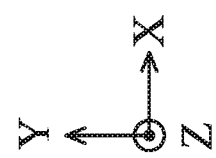

Specifically, refer to FIG. 1B, which is a schematic diagram showing projection areas of some elements of the radiation-sensing device 10 (e.g., the photosensitive elements 202 and the first blocking walls 104A in the area $A_1$ of FIG. 1A) on the substrate 102 in accordance with some embodiments of the present disclosure. As shown in FIG. 1B, the photosensitive element 202 may have a projection 202P in the normal direction of the substrate 102 (for example, the Z direction shown in the figure), and the first blocking wall 104A may have a projection 104AP on the substrate 102. The projection 104AP of the first blocking wall 104A on the substrate 102 may overlap with the projection 202P of the corresponding photosensitive element 202 on the substrate 102. In some embodiments, the projection 202P of a part of the photosensitive elements 202 may be entirely located in the projection 104AP of the first blocking wall 104A. In addition, in some embodiments, the area of the projection 104AP of the first blocking wall 104A may be greater than or equal to the area of the projection 202P of the photosensitive element 202. In some embodiments, the projection 104BP of the first scintillator element 104B on the substrate 102 may also overlap with the projection 202P of the corresponding photosensitive element 202 on the substrate 102. In some embodiments, the projection 202P of a part of the photosensitive elements 202 may also be entirely located in the projection 104BP of the first scintillator element 104B.

Moreover, referring to FIG. 1A and FIG. 1B, in some embodiments, a part of the photosensitive elements 202 may be disposed corresponding to the first scintillator elements 104B. In other words, in some embodiments, in the normal direction of the substrate 102 (for example, the Z direction shown in the figure), a part of the photosensitive elements 202 (e.g., the photosensitive element labeled 202b in the figure) overlap with the first scintillator elements 104B.

It should be understood that in accordance with some embodiments of the present disclosure, the term "overlap" may refer to entirely overlap or partially overlap in the normal direction of the substrate 102 (for example, the Z direction shown in the figure).

In the above configuration, a part of the photosensitive elements 202 (for example, the photosensitive element 202b) can simultaneously receive the visible light $L_1$ generated by the conversion of the lower energy radiation $X_1$ through the first scintillator layer 104, and the visible light $L_2$ generated by the conversion of the higher energy radiation $X_2$ through the second scintillator layers 106. The received visible light $L_1$ and visible light $L_2$ can be processed to generate an image converted from the superposition of higher energy radiation signal and lower energy radiation signal. On the other hand, a part of the photosensitive elements 202 (for example, the photosensitive element 202a) receive at least the visible light $L_1$ generated by the conversion of the lower energy radiation $X_1$ through the second scintillator layer 106, and the received visible light $L_1$ can be processed to generate an image converted from the lower energy radiation signal. In some embodiments, a part of the photosensitive elements 202 (e.g., the photosensitive element 202a or the photosensitive element 202b) can further receive the radiation whose energy is in a range overlapping with the ranges of higher energy radiation and lower energy radiation.

According to the imaging results corresponding to the higher energy radiation and the lower energy radiation generated by a part of the photosensitive elements 202 (e.g., the photosensitive element 202b) and the image results corresponding to lower energy radiation generated by a part of the photosensitive element 202 (e.g., the photosensitive element 202a), image data calculations can be performed and the images of higher energy radiation (e.g., the image of the bone part is clear) and images of lower energy radiation (the image of the tissue part is clear) can be obtained separately.

For example, in some embodiments, weighted subtraction for signal parameters at specific portions (e.g., bones or tissues) in the image results of higher energy radiation and lower energy radiation and the images of lower energy radiation may be conducted. For example, the signal parameter values of the two image results are multiplied by a specific scaling factor and subtracted to obtain clear images of high energy radiation and low energy radiation, respectively.

In addition, it should be understood that in accordance with some embodiments of the present disclosure, the radiation has a low to high energy range, the energy range of the high energy radiation partially overlaps with the energy range of the low energy radiation, and "higher energy radiation" means radiation from outside the overlapping range to a high energy range, and "lower energy radiation" means radiation from a low energy to outside the overlapping range. Furthermore, the present disclosure does not limit the specific numerical ranges of the "higher energy radiation" and the "lower energy radiation" as long as they have the relative relationship defined above.

Furthermore, in some embodiments, the photosensitive element 202 is separated from the first scintillator layer 104 (or the first scintillator element 104B) by a first distance $D_1$, and the photosensitive element 202 is separated from the second scintillator layer 106 by a second distance (not illustrated), which can also be regarded as the thickness of the substrate 102 (i.e. the first thickness $T_1$). In some embodiments, the first distance $D_1$ is less than or equal to the second distance (first thickness $T_1$).

In accordance with some embodiments of the present disclosure, the first distance $D_1$ refers to the minimum distance between the photosensitive element 202 and the first scintillator element 104B, and the second distance $D_2$ refers to the minimum distance between the photosensitive element 202 and the second scintillator layer 106.

Continuing to refer to FIG. 1A, in some embodiments, the array layer 200 further includes an insulating structure 204. In some embodiments, the insulating structure 204 can package and fix the photosensitive elements 202 on the substrate 102. In some embodiments, the photosensitive element 202 may be embedded in the insulating structure 204. In some embodiments, the insulating structure 204 may have a single-layer or multi-layer structure. For example, in accordance with some embodiments, the insulating structure 204 may further include a plurality of insulating layers, such as a first insulating layer 402, a second insulating layer 404, a third insulating layer 406, and a fourth insulating layer 408 as shown in FIG. 4C or FIG. 6C. The detailed structure of the photosensitive element 202 (including the insulating structure 204) in the embodiments of the present disclosure will be further described later.

In some embodiments, the foregoing physical vapor deposition (PVD) process, chemical vapor deposition (CVD) process, coating process, other suitable process, or a combination thereof may be used to form the insulating structure 204.

In addition, as shown in FIG. 1A, in accordance with some embodiments, the radiation-sensing device 10 may optionally include a reflective layer 108, and the reflective layer 108 and the substrate 102 are disposed on two opposite sides of the second scintillator layer 106, respectively. The reflective layer 108 can improve the utilization rate of visible light generated by the first scintillator layer 104 or the second scintillator layer 106. However, in accordance with some embodiments, the radiation-sensing device 10 may not have the reflective layer 108 (for example, the embodiments shown in FIG. 2 and FIG. 3), thereby improving the resolution of the image.

The reflective layer 108 may include a material having a high reflectivity (e.g., greater than 90%). In some embodiments, the reflective material of the reflective layer 108 may include a matrix and high reflection coefficient particles dispersed in the substrate, but it is not limited thereto. In some embodiments, the matrix may include organic resin, glass paste, other suitable materials, or a combination thereof, but it is not limited thereto. In some embodiments, the material of the high reflection coefficient particles may include silver (Ag), aluminum (Al), titanium (Ti), titanium dioxide ($TiO_2$), niobium-doped titanium oxide (TNO), zinc oxide (ZnO), zirconium dioxide ($ZrO_2$), or a combination thereof, but it is not limited thereto. In some embodiments, a coating of the material of the aforementioned high reflection coefficient particles can also be used as the reflection layer 108.

In some embodiments, the foregoing physical vapor deposition (PVD) process, chemical vapor deposition (CVD) process, coating process, other suitable process, or a combination thereof may be used to form the reflective layer 108. Next, refer to FIG. 2, which is a schematic cross-sectional structure diagram of a radiation-sensing device 20 in accordance with some other embodiments of the present disclosure. It should be understood that the same or similar components or elements in the following context will be denoted by the same or similar reference numerals, and their materials, manufacturing methods and functions are the same as or similar to those described above, and thus they will not be repeated in the following context.

Figure 2:
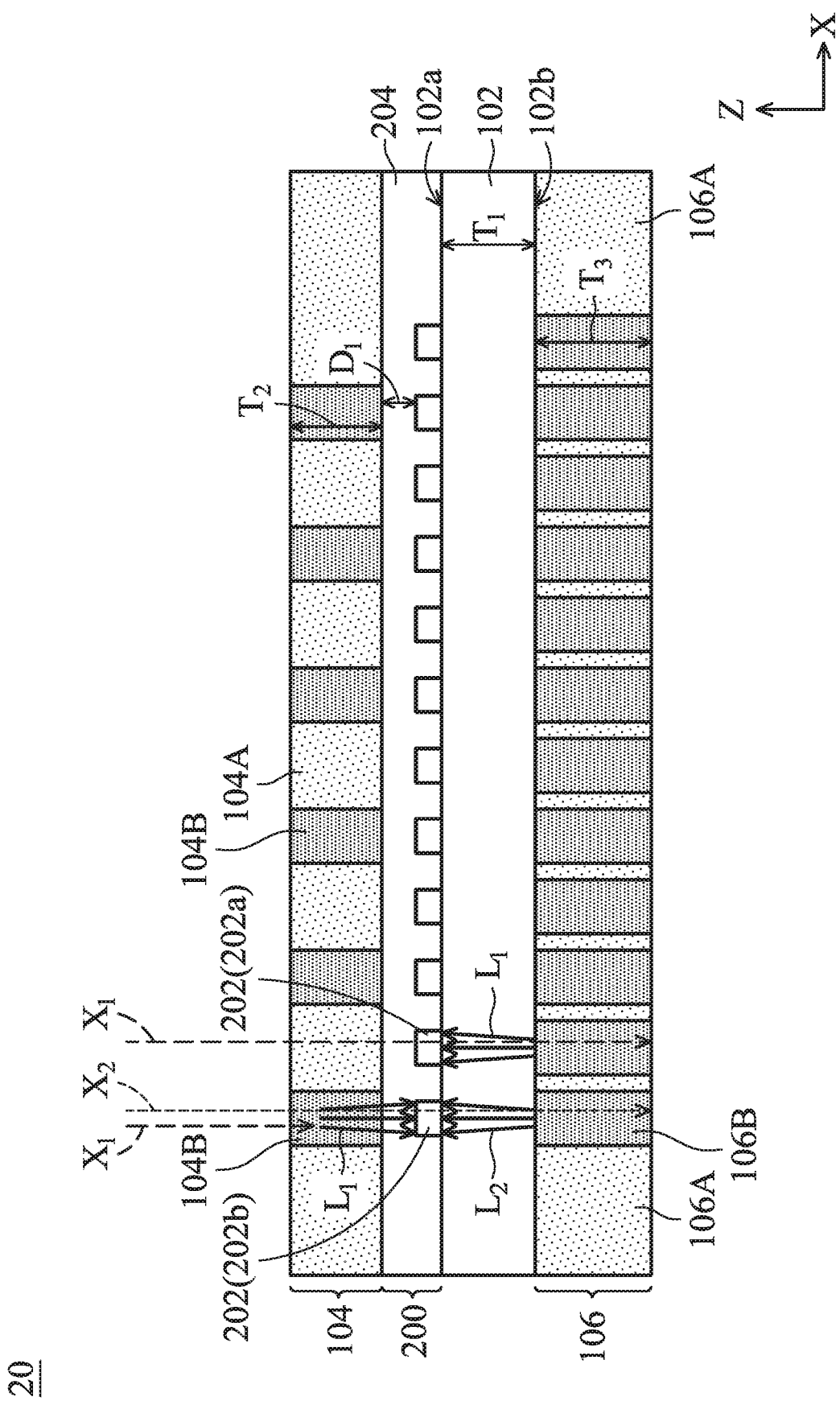
FIG. 2 is a schematic cross-sectional structure diagram of a radiation-sensing device in accordance with some embodiments of the present disclosure.

The embodiment shown in FIG. 2 is similar to the embodiment shown in FIG. 1A. The difference between them includes that in the radiation-sensing device 20 shown in FIG. 2, the second scintillator layer 106 may also include a plurality of second blocking walls 106A and a plurality of second scintillator elements 106B, and the second scintillator elements 106B are located between the second blocking walls 106A. In other words, in this embodiment, the second scintillator layer 106 may be pixelated, in which the second blocking walls 106A and the second scintillator elements 106B are spaced apart from each other (disposed alternately).

In some embodiments, the second scintillator elements 106B may be disposed corresponding to the photosensitive elements 202. In other words, in some embodiments, the second scintillator elements 106B overlap with the photosensitive elements 202 in the normal direction of the substrate 102 (for example, the Z direction shown in the figure). In some embodiments, in the normal direction of the substrate 102, the second blocking walls 106A and the photosensitive elements 202 do not overlap, that is, the projection 202P (not illustrated) of the photosensitive element 202 on the substrate 102 is disposed between the projections (not illustrated) of the two adjacent second blocking walls 106A on the substrate 102.

In this embodiment, the second scintillator element 106B can convert radiation (such as radiation $X_2$) that has passed through the first scintillator element 104B without being absorbed due to higher energy into visible light (such as visible light $L_2$). In addition, the second scintillator layer 106 can also convert the radiation (such as radiation $X_1$) that has passed through the first blocking wall 104A of the first scintillator layer 104 without being absorbed into visible light (such as visible light $L_1$).

Furthermore, the materials and forming methods of the second blocking wall 106A and the second scintillator element 106B are similar to those of the first blocking wall 104A and the first scintillator element 104B, and thus will not be repeated herein. In addition, in some embodiments, the number of the first blocking walls 104A and the number of the second blocking walls 106A may be different. Specifically, in accordance with some embodiments, the number of the first blocking walls 104A and the second blocking walls 106A refers to the number of the first blocking walls 104A and the second blocking walls in the same cross-section (for example, the XZ plane). Furthermore, in accordance with some embodiments, the first blocking wall 104A, the second blocking wall 106A, and the photosensitive element 202 need to exist in the cross-section at the same time.

Figure 3:
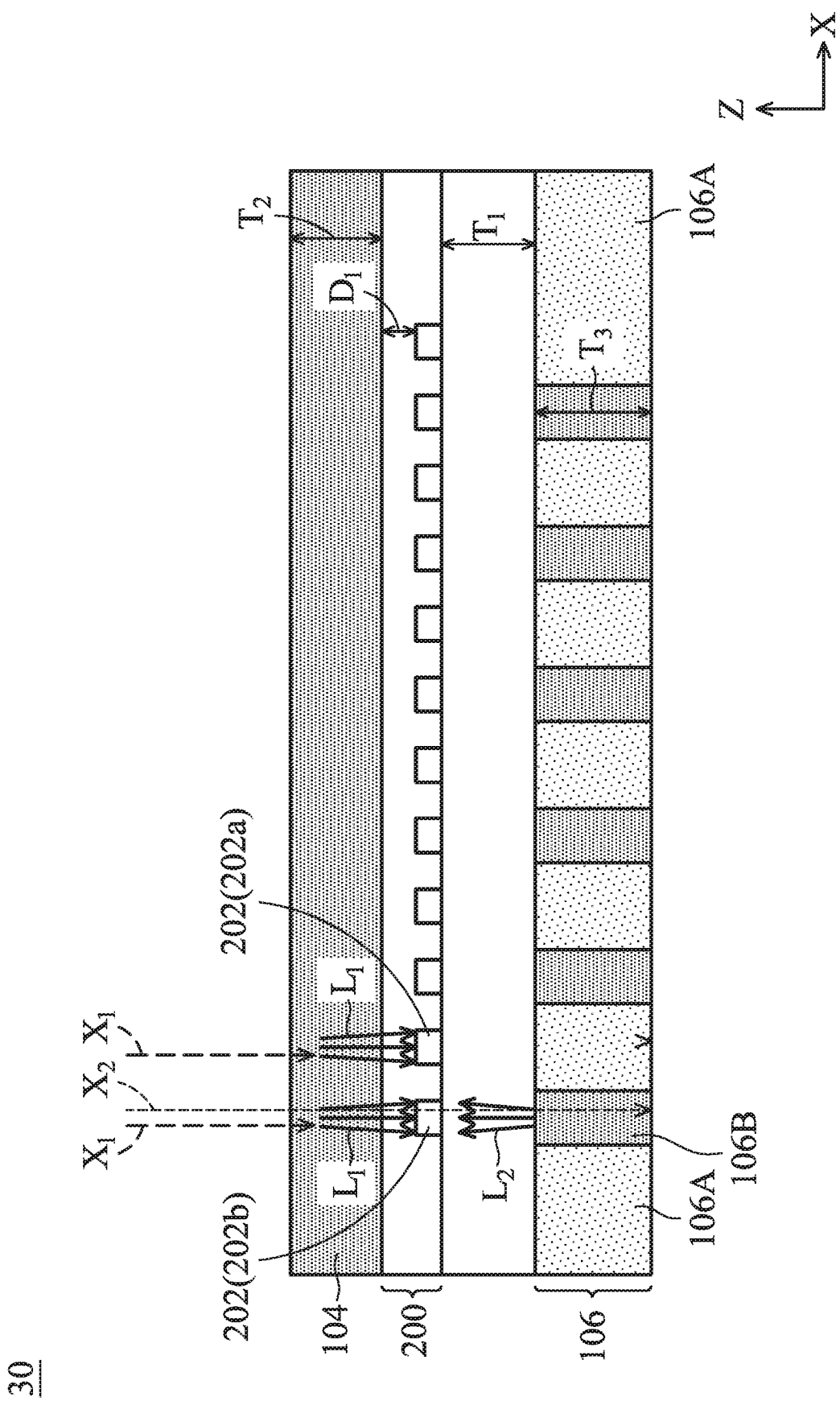
FIG. 3 is a schematic cross-sectional structure diagram of a radiation-sensing device in accordance with some embodiments of the present disclosure.

Next, refer to FIG. 3, which is a schematic cross-sectional structure diagram of a radiation-sensing device 30 in accordance with some other embodiments of the present disclosure. The embodiment shown in FIG. 3 is similar to the embodiment shown in FIG. 1A. the difference between them includes that in the radiation-sensing device 30 shown in FIG. 3, the first scintillator layer 104 is an unpixelated layer while the second scintillator layer 106 is pixelated. Specifically, the second scintillator layer 106 includes a plurality of second blocking walls 106A and a plurality of second scintillator elements 106B, that is, the photosensitive elements 202 and the first scintillator layer 104 that is unpixelated are located on the same side of the substrate 102.

In this embodiment, a part of the photosensitive elements 202 may be disposed corresponding to the second blocking walls 106A. In other words, in the normal direction of the substrate 102, a part of the photosensitive elements 202 (for example, the photosensitive element labeled 202a in the figure) may overlap with the second blocking walls 106A. Specifically, in this embodiment, the projection (not illustrated) of the second blocking wall 106A on the substrate 102 overlaps with the projection 202P (not illustrated) of a part of the photosensitive elements 202 on the substrate 102.

In addition, in this embodiment, a part of the photosensitive elements 202 may be disposed corresponding to the second scintillator elements 106B. In other words, in the normal direction of the substrate 102, a part of the photosensitive elements 202 (for example, labeled 202b in the figure) may overlap with the second scintillator elements 106B.

In the above configuration, a part of the photosensitive elements 202 (for example, the photosensitive element 202b) can simultaneously receive the visible light $L_1$ generated by the conversion of the lower energy radiation $X_1$ through the first scintillator layer 104, and the visible light $L_2$ generated by the conversion of the higher energy radiation $X_2$ through the second scintillator layers 106. On the other hand, a part of the photosensitive elements 202 (for example, the photosensitive element 202a) can receive at least the visible light $L_1$ generated by the conversion of the lower energy radiation $X_1$ through the first scintillator layer 104.

Figure 4A:
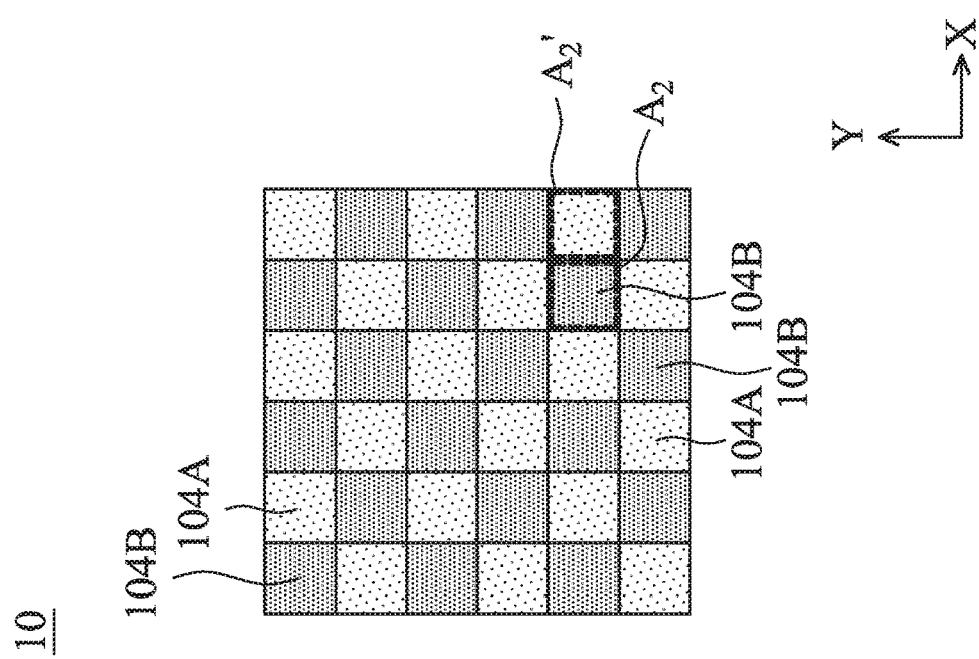
FIG. 4A is a schematic top-view structure diagram of a radiation-sensing device in accordance with some embodiments of the present disclosure.
Figure 4C:
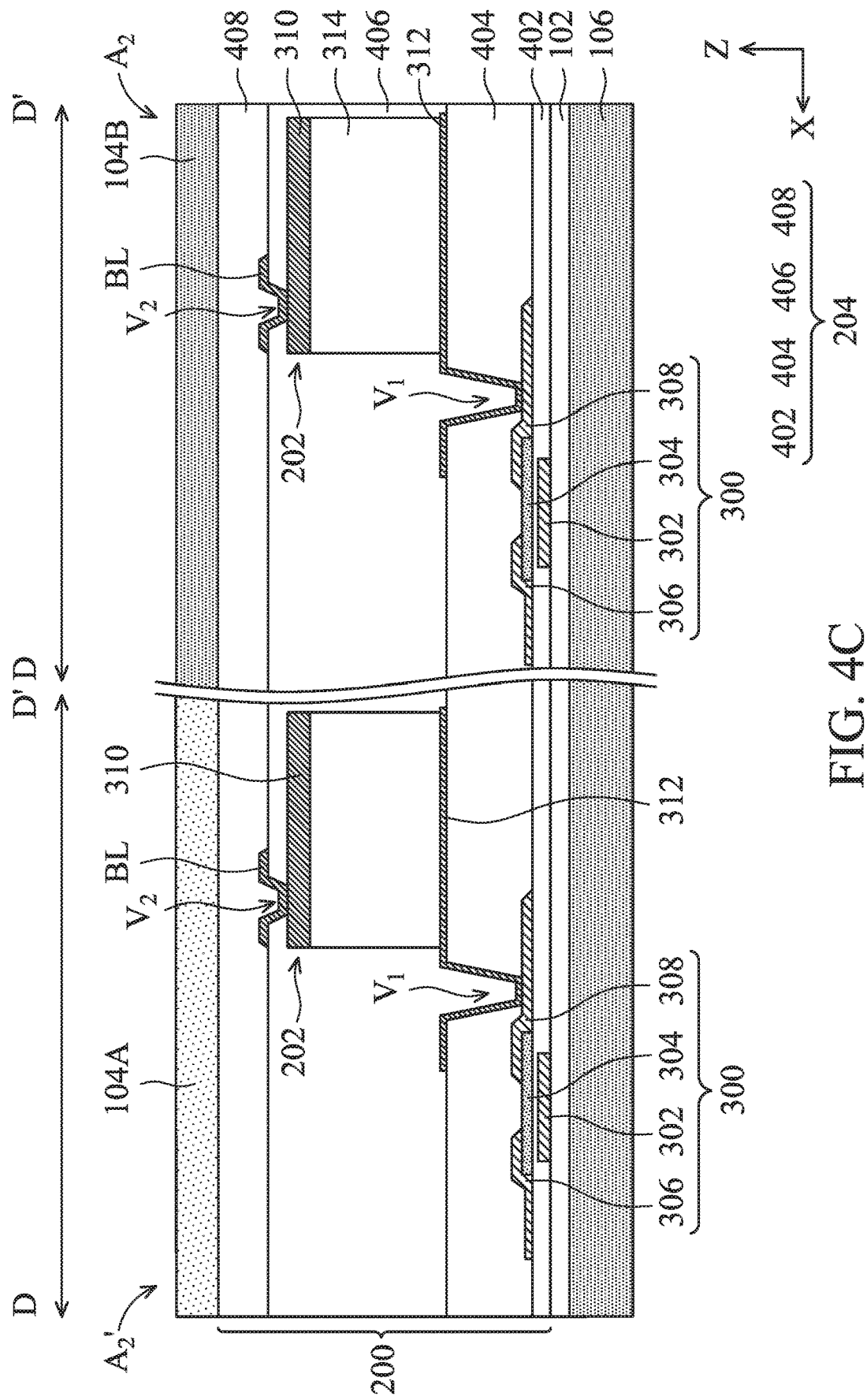
FIG. 4C is a schematic cross-sectional structure diagram of the radiation-sensing device along a section line D-D' in FIG. 4B in accordance with some embodiments of the present disclosure.

Next, refer to FIG. 4A, which is a schematic top-view structure diagram of the radiation-sensing device 10 in accordance with some embodiments of the present disclosure. As shown in FIG. 4A, in some embodiments, the first blocking walls 104A and the first scintillator elements 104B of the first scintillator layer 104 may be arranged in an alternate manner from each other, but the present disclosure is not limited thereto. It should be understood that, in accordance with some other embodiments, an appropriate arrangement of the first blocking walls 104A and the first scintillator elements 104B may be adjusted according to actual needs. In addition, in some embodiments, the first blocking wall 104A and the first scintillator element 104B may respectively correspond to one pixel region, but the present disclosure is not limited thereto.

More specifically, refer to FIG. 4B, which is a schematic top-view structure diagram of the array layer 200 in the area $A_2$ shown in FIG. 4A in accordance with some embodiments of the present disclosure. It should be understood that, some of the elements (for example, the insulating structure 204) are omitted in FIG. 4B to clearly illustrate the detailed structure of the array layer 200.

As shown in FIG. 4B, in addition to the photosensitive element 202, the array layer 200 may further include a driving element 300 and data lines DL, scanning lines (gate lines) GL, and bias lines BL that are electrically connected to the driving element 300. Specifically, the photosensitive element 202 can convert light energy into an electronic signal, and the driving element 300 can read the electronic signal generated by the photosensitive element 202 and control the pixels to be turned on or off. In some embodiments, the driving element 300 may include a thin-film transistor (TFT). In some embodiments, the data line DL, the scan line GL, and the bias line BL may be electrically connected to the driving element 300 and the photosensitive element 202, respectively, and work together to control the driving element 300 and the photosensitive element 202, i.e. control the pixel area.

In addition, refer to FIG. 4C at the same time. FIG. 4C is a schematic cross-sectional structure diagram of the radiation-sensing device 10 along a section line D-D' in FIG. 4B in accordance with some embodiments of the present disclosure. It should be understood that, in order to clearly illustrate the relationship between the array layer 200 and the first scintillator layer 104 (including the first blocking wall 104A and the first scintillator element 104B), FIG. 4C illustrates a cross-sectional structure diagram of an area $A_2$' that corresponds to the area $A_2$ shown in FIG. 4A. For example, the area $A_2$ corresponds to a set of photosensitive element 202 and first scintillator element 104B, and area $A_2$' corresponds to a set of photosensitive element 202 and first blocking wall 104A.

As shown in FIG. 4B and FIG. 4C, the driving element 300 may be disposed on the substrate 102. In some embodiments, the driving element 300 may include a gate electrode layer 302, an active layer 304, a drain electrode layer 306, and a source electrode layer 308. In some embodiments, the gate electrode layer 302 may be electrically connected to the scan line GL, the drain electrode layer 306 may be electrically connected to the data line DL, and the source electrode layer 308 may be electrically connected to the photosensitive element 202.

In some embodiments, the material of the gate electrode layer 302 may include, but is not limited to, copper (Cu), aluminum (Al), molybdenum (Mo), tungsten (W), gold (Au), chromium (Cr), nickel (Ni), platinum (Pt), titanium (Ti), copper alloy, aluminum alloy, molybdenum alloy, tungsten alloy, gold alloy, chromium alloy, nickel alloy, platinum alloy, titanium alloy, other suitable metal materials, or a combination thereof. In some embodiments, the material of the active layer 304 may include amorphous silicon, polycrystalline silicon, metal nitride, metal oxide, other suitable materials, or a combination thereof, but it is not limited thereto. In some embodiments, the materials of the aforementioned drain electrode layer 306 and source electrode layer 308 may include, but are not limited to, copper (Cu), aluminum (Al), molybdenum (Mo), tungsten (W), gold (Au), and chromium (Cr), nickel (Ni), platinum (Pt), titanium (Ti), copper alloy, aluminum alloy, molybdenum alloy, tungsten alloy, gold alloy, chromium alloy, nickel alloy, platinum alloy, titanium alloy, other suitable metal materials or a combination thereof.

In addition, it should be understood that although in the embodiment shown in FIG. 4C, the driving element 300 is a bottom gate thin-film transistor, the driving element 300 may be a top gate thin-film transistor in accordance with some other embodiments.

In some embodiments, the insulating structure 204 in the array layer 200 may further include a first insulating layer 402 and a second insulating layer 404. The first insulating layer 402 may be disposed between the gate electrode layer 302 and the active layer 304, and the second insulating layer 404 may be disposed on the first insulating layer 402. In some embodiments, the first insulating layer 402 can serve as a gate dielectric layer.

Specifically, in some embodiments, the first insulating layer 402 and the second insulating layer 404 may include silicon oxide, silicon nitride, silicon oxynitride, high-k dielectric material, other suitable dielectric materials or a combination thereof, or inorganic materials, organic materials, or a combination thereof, but are not limited thereto. The high-k dielectric material may include, but is not limited to, a metal oxide, a metal nitride, a metal silicide, a metal aluminate, a zirconium silicate, a zirconium aluminate, or a combination thereof. The inorganic material may include, but is not limited to, silicon nitride, silicon dioxide, silicon oxynitride, or a combination thereof. The organic material may include, but is not limited to, perfluoroalkoxy alkane (PFA), polytetrafluoroethylene (PTFE), fluorinated ethylene propylene (FEP), polyethylene or a combination thereof.

In addition, as shown in FIG. 4C, the photosensitive element 202 may include a first electrode 310, a second electrode 312, and a semiconductor layer 314, and the semiconductor layer 314 may be disposed between the first electrode 310 and the second electrode 312. As described above, the source electrode layer 308 may be electrically connected to the photosensitive element 202. Specifically, in some embodiments, the second electrode 312 of the photosensitive element 202 may be electrically connected to the driving element 300 through a via $V_1$. On the other hand, in some embodiments, the first electrode 310 of the photosensitive element 202 may be electrically connected to the bias line BL through a via $V_2$. In addition, it should be understood that although the via $V_1$ shown in the figure does not overlap with the photosensitive element 202 in the normal direction of the substrate 102, the via $V_1$ may overlap with the photosensitive element 202 in accordance with some other embodiments. For example, the via $V_1$ may be disposed directly below the photosensitive element 202. Furthermore, in the embodiment where the via $V_1$ overlaps with the photosensitive element 202, the thickness of the second insulating layer 404 needs to be increased.

In some embodiments, the semiconductor layer 314 may have an n-i-p structure or a p-i-n structure. In some embodiments, the p-type semiconductor layer material may include amorphous silicon semiconductor that is doped with group III elements, such as boron, aluminum, gallium, or other suitable doping elements, but it is not limited thereto. In some embodiments, the n-type semiconductor layer material may include amorphous silicon semiconductor that is doped with group V elements, such as nitrogen, phosphorus, arsenic, or other suitable doping elements or combinations thereof, but it is not limited thereto.

In some embodiments, the materials of the first electrode 310 and the second electrode 312 may include, but are not limited to, a metal conductive material, a transparent conductive material, or a combination thereof. The metal conductive materials may include, but is not limited to, copper (Cu), aluminum (Al), tungsten (W), titanium (Ti), gold (Au), platinum (Pt), nickel (Ni), copper alloy, aluminum alloy, tungsten alloy, titanium alloys, gold alloys, platinum alloys, nickel alloys, or a combination thereof. The transparent conductive material may include a transparent conductive oxide (TCO). For example, the transparent conductive oxide may include, but is not limited to, indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO) or a combination thereof.

In some embodiments, the array layer 200 may further include a third insulating layer 406 and a fourth insulating layer 408. The third insulating layer 406 may be disposed on the photosensitive element 202, and the fourth insulating layer 408 may be disposed on the third insulating layer 406. In some embodiments, the materials of the third insulating layer 406 and the fourth insulating layer 408 are similar to that of the aforementioned first insulating layer and second insulating layer, and thus will not be repeated herein.

As shown in FIG. 4C, in some embodiments, the first blocking wall 104A and the first scintillator element 104B may be disposed on the fourth insulating layer 408. In some embodiments, in the normal direction of the substrate 102, the first blocking wall 104A and the first scintillator element 104B overlap with the two corresponding photosensitive elements 202, respectively. It should be noted that, in the normal direction of the substrate 102, the first blocking wall 104A and the first scintillator element 104B overlap with the semiconductor layers 314 of the two corresponding photosensitive elements 202, respectively. Furthermore, it should be understood that in accordance with some embodiments of the present disclosure, the projection 202P of the photosensitive element 202 on the substrate 102 shown in FIG. 1B can be regarded as the projection of the semiconductor layer 314 on the substrate 102.

In some embodiments, in the normal direction of the substrate 102, the first blocking wall 104A and the first scintillator element 104B may overlap or not overlap the driving element 300. In addition, in some embodiments, the area of the first blocking wall 104A or the first scintillator element 104B may be equal to or smaller than the area of the pixel region, which is not limited in the present disclosure.

As described above, according to different embodiments, the first blocking wall 104A and the first scintillator element 104B may have different arrangements. Specifically, refer to FIGS. 5A to 5F, which are schematic top-view structure diagrams of the radiation-sensing device in accordance with some other embodiments of the present disclosure.

Figure 5B:
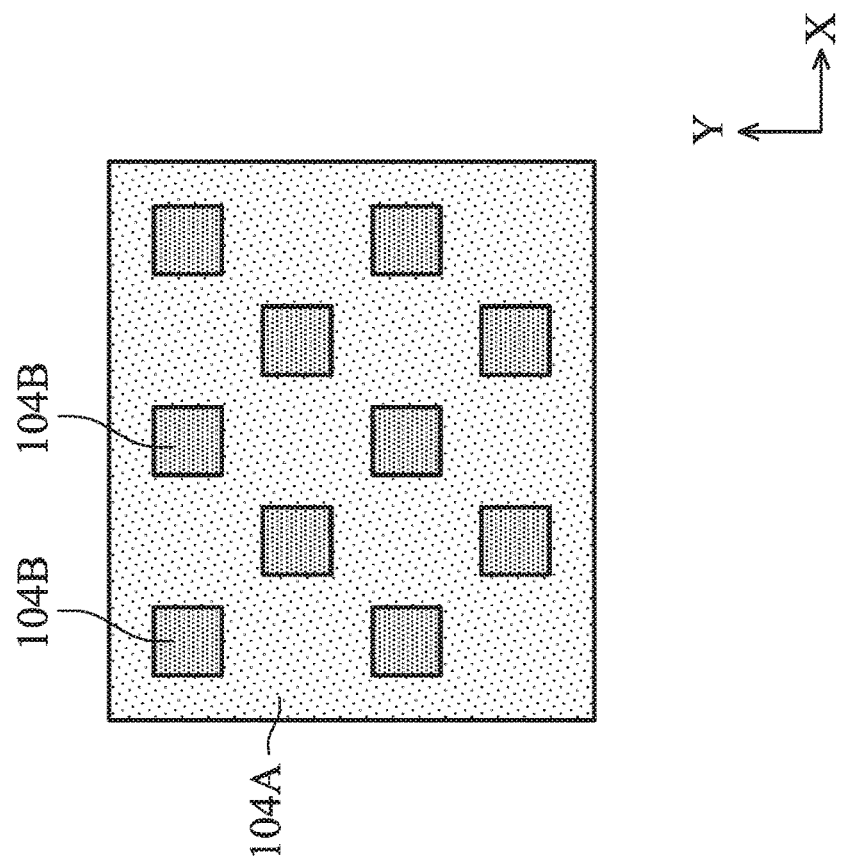
FIGS. 5A to 5F are schematic top-view structure diagrams of a radiation-sensing device in accordance with some embodiments of the present disclosure.
Figure 5A:
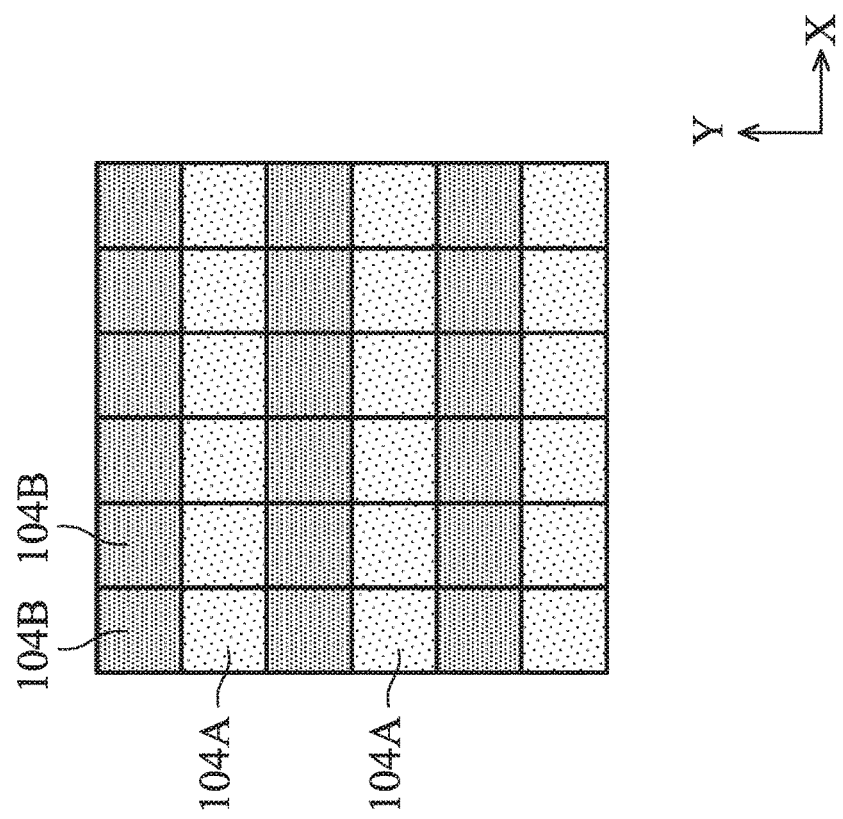

As shown in FIG. 5A, in some embodiments, the first blocking walls 104A and the first scintillator elements 104B may be alternately arranged in a row or in a column. In this embodiment, the first blocking walls 104A or the first scintillator elements 104B in the same row may correspond to the pixel regions in the same row, but the present disclosure is not limited thereto. In some embodiments, the pixel region may include one photosensitive element 202 and one driving element 300, but the present disclosure is not limited thereto. For example, in some other embodiments, the pixel region may include a combination of one photosensitive element 202 and a plurality of driving elements 300.

Furthermore, as shown in FIG. 5B, in some embodiments, the first scintillator elements 104B may be dispersed in the first blocking wall 104A, and the first blocking wall 104A may be disposed around the first scintillator elements 104B. In this embodiment, each first scintillator element 104B may correspond to one pixel region, and the first blocking wall 104A may correspond to a plurality of pixel regions, such as adjacent pixel regions, but the present disclosure is not limited thereto.

In addition, in the embodiments shown in FIG. 4A, FIG. 5A, and FIG. 5B, the first scintillator element 104B has a quadrangular shape with equal sides, but the present disclosure is not limited thereto. It should be understood that according to different embodiments, the first scintillator element 104B may have any suitable shape according to actual needs. For example, as shown in FIGS. 5C to 5F, in some embodiments, the first blocking wall 104A and the first scintillator element 104B may have quadrangular shapes with four sides that are not equal.

Figure 5C:
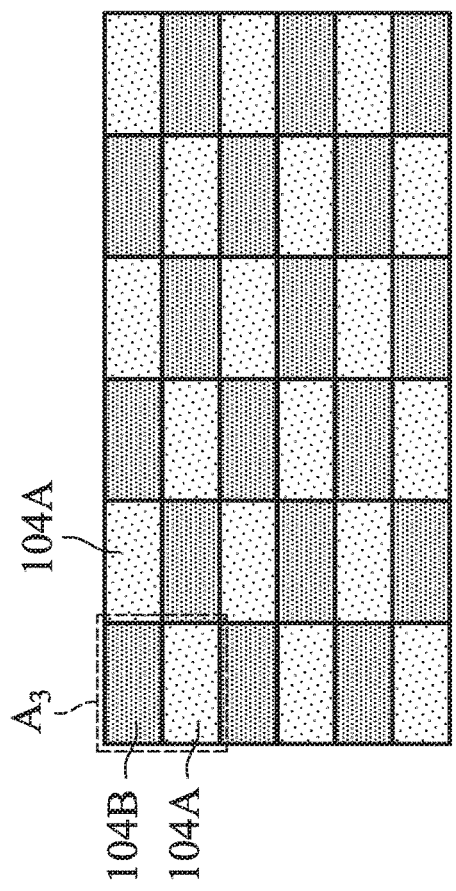
Figure 5D:
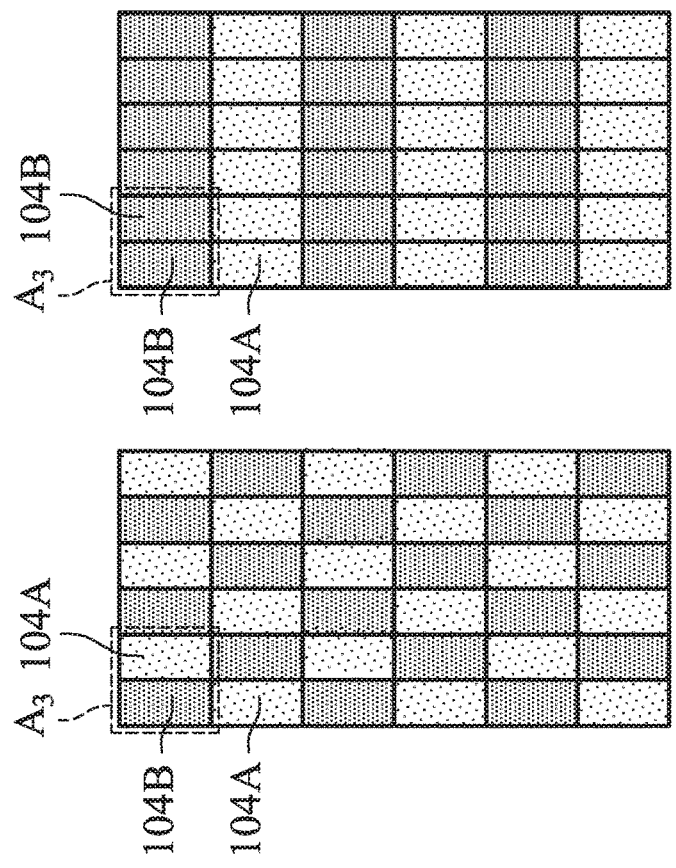
Figures 5E, 5F:
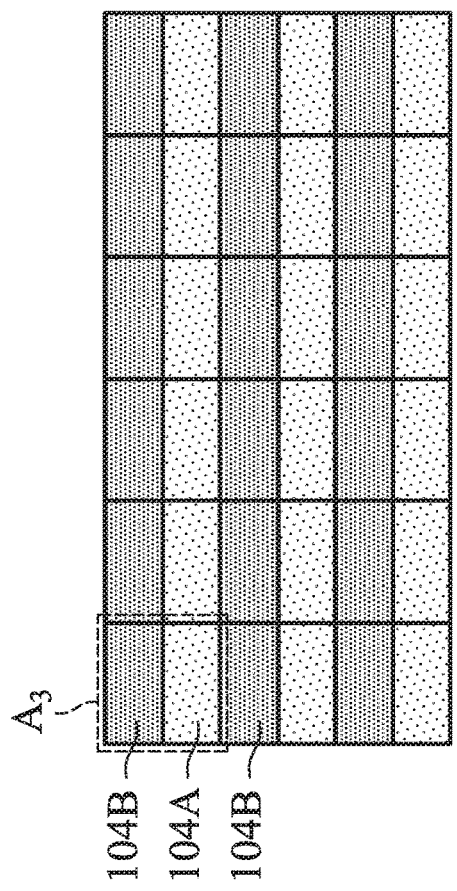

Specifically, as shown in FIG. 5C and FIG. 5D, in some embodiments, the first blocking wall 104A and the first scintillator element 104B may have a quadrangular shape whose side length in a longitudinal direction (e.g., the Y direction) is greater than the side length in a lateral direction (e.g., the X direction). Furthermore, as shown in FIG. 5E and FIG. 5F, in some embodiments, the first blocking wall 104A and the first scintillator element 104B may have a quadrangular shape whose side length in a lateral direction (e.g., the X direction) is greater than the side length in a longitudinal direction (e.g., the Y direction). Furthermore, in FIG. 5C and FIG. 5E, the first blocking walls 104A and the first scintillator elements 104B are staggered; in FIG. 5D and FIG. 5F, the first blocking walls 104A and the first scintillator elements 104B are arranged along the same direction. In some embodiments, each of the first scintillator element 104B and the first blocking wall 104A may correspond to a pixel region, but the present disclosure is not limited thereto. For example, in some other embodiments, two adjacent first blocking walls 104A, two adjacent first scintillator elements 104B, or two adjacent first blocking walls 104A and first scintillator elements 104B may form a quadrangular shape with four equal sides (e.g., area $A_3$ as shown in the figure).

Figure 6A:
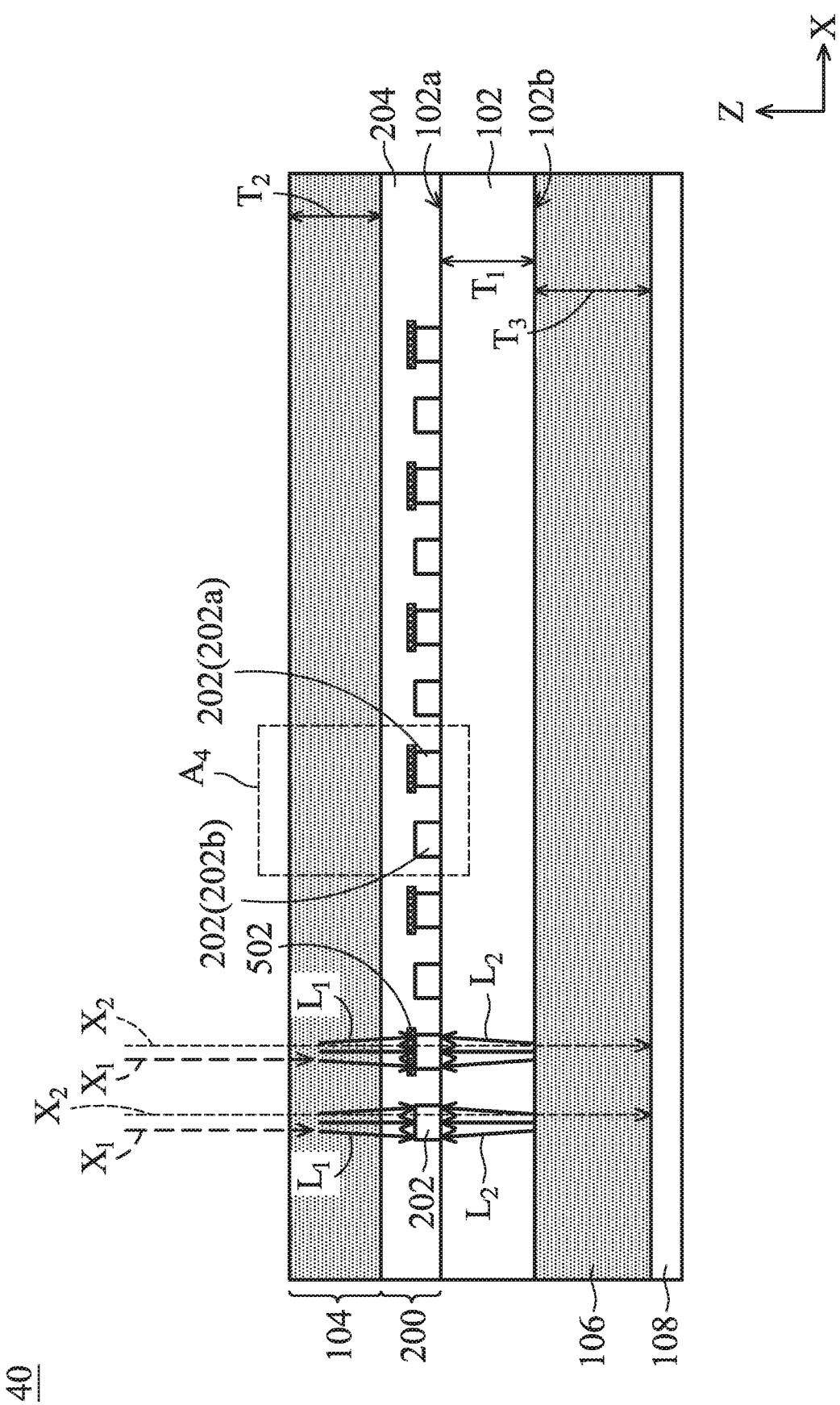
FIG. 6A is a schematic cross-sectional structure diagram of a radiation-sensing device in accordance with some embodiments of the present disclosure.

Next, refer to FIG. 6A, which is a schematic cross-sectional structure diagram of a radiation-sensing device 40 in accordance with some other embodiments of the present disclosure. As shown in FIG. 6A, in some embodiments, the first scintillator layer 104 and the second scintillator layer 106 may both be unpixelated. In some embodiments, the array layer 200 may further include a light-shielding element 502. The light-shielding element 502 may be disposed on a part of the light-sensitive elements 202. In some embodiments, the light-shielding element 502 is disposed between the first scintillator layer 104 and the photosensitive element 202. In other embodiments, the light-shielding element 502 is disposed between the second scintillator layer 106 and the photosensitive element 202.

In accordance with some embodiments, the first scintillator layer 104 may convert lower energy radiation (such as the radiation $X_1$ shown in the figure) into visible light (such as the visible light $L_1$ shown in the figure). Moreover, the second scintillator layer 106 can convert the radiation (such as the radiation $X_2$ shown in the figure) that passes through the first scintillator layer 104 without being absorbed due to higher energy into visible light (such as the visible light $L_2$ shown in the figure).

In some embodiments, the light-shielding element 502 may be disposed corresponding to a part of the photosensitive elements 202. In other words, in some embodiments, in the normal direction of the substrate 102 (for example, the Z direction shown in the figure), the light-shielding element 502 may overlap with a part of the photosensitive elements 202 (for example, the photosensitive element labeled 202a in the figure).

Figure 6B:
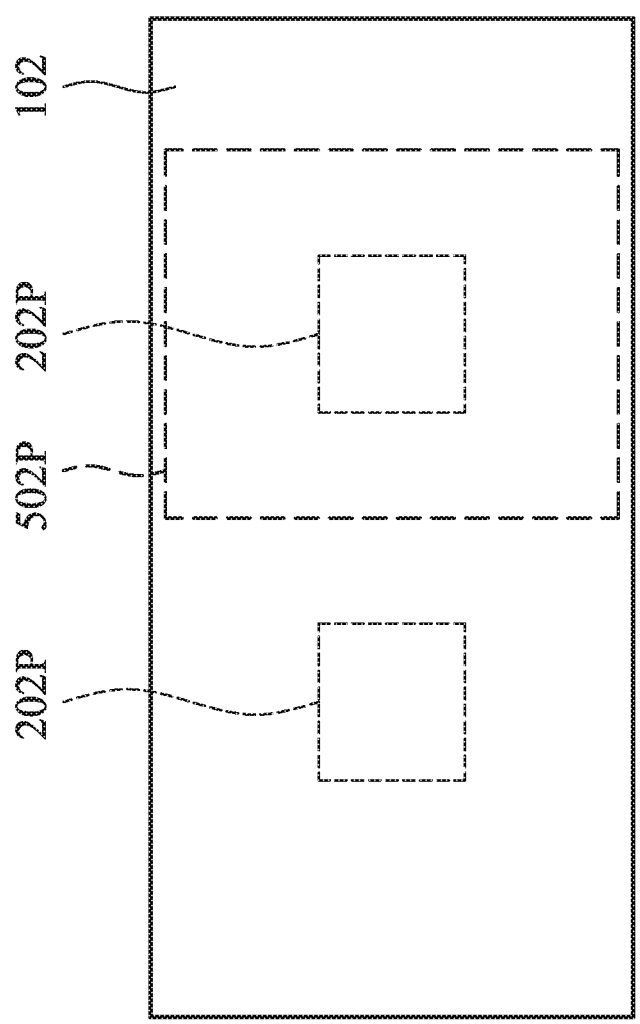
FIG. 6B is a schematic diagram showing projection areas of some elements of a radiation-sensing device in accordance with some embodiments of the present disclosure.
Figure 6C:
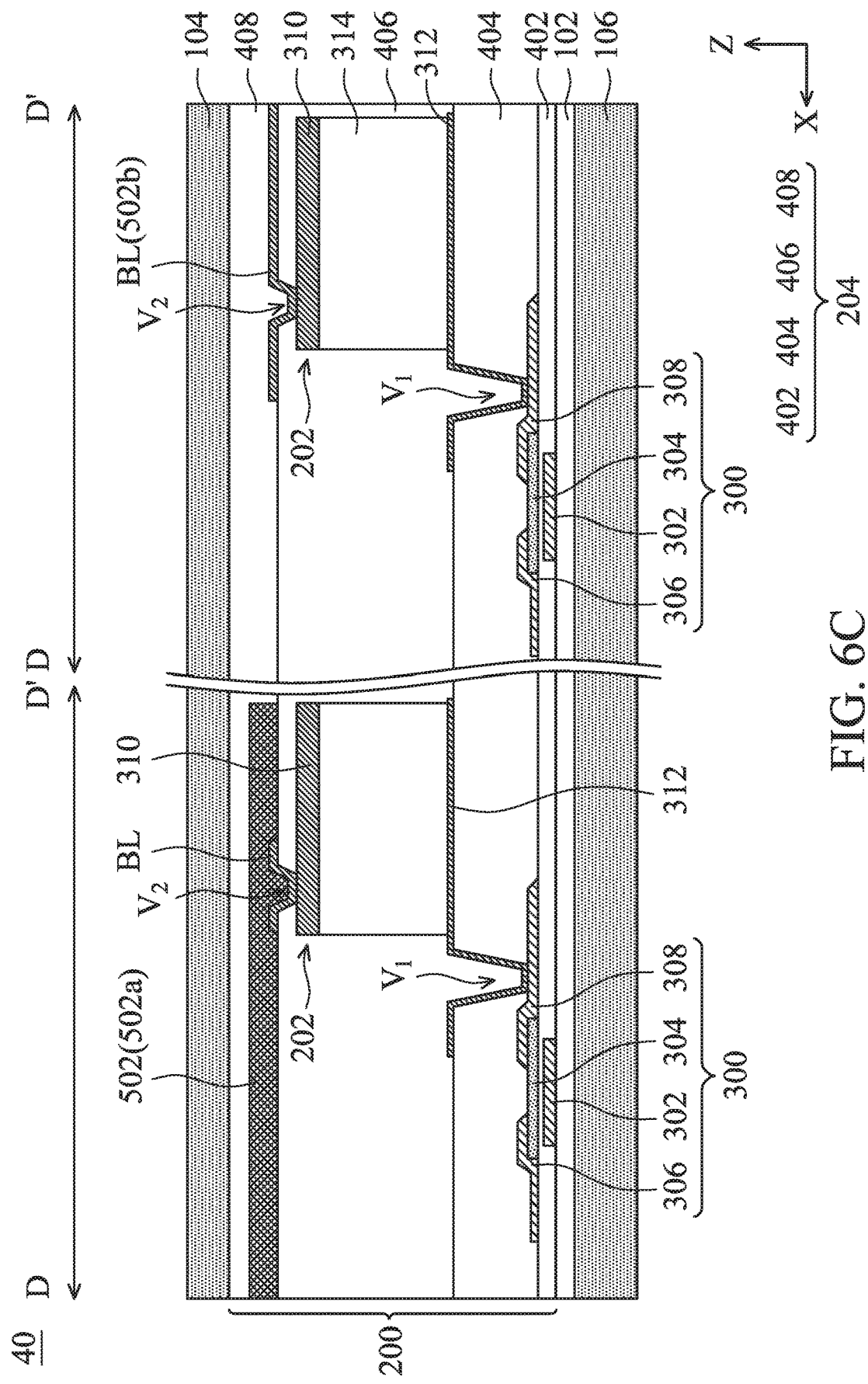
FIG. 6C is a schematic cross-sectional structure diagram of the radiation-sensing device along a section line D-D' in FIG. 4B in accordance with some embodiments of the present disclosure.

Specifically, refer to FIG. 6B, which is a schematic diagram showing projection areas of some elements of the radiation-sensing device 40 (e.g., the light-sensitive element 202 and the light-shielding element 502 in the area $A_4$ in FIG. 6A) on the substrate 102 in accordance with some embodiments of the present disclosure. As shown in FIG. 6B, the photosensitive element 202 may have a projection 202P on the substrate 102, and the light-shielding element 502 may have a projection 502P on the substrate 102. The projection 502P of the light-shielding element 502 on the substrate 102 may overlap with the projection 202P of a part of the photosensitive elements 202 on the substrate 102. In some embodiments, the projection 202P of a part of the light sensitive elements 202 may be entirely located in the projection 502P of the light-shielding element 502. In addition, in some embodiments, the area of the projection 502P of the light-shielding element 502 is greater than or equal to the area of the projection 202P of the light sensitive element 202. In addition, it should be understood that in accordance with some embodiments of the present disclosure, the projection 202P of the photosensitive element 202 on the substrate 102 shown in FIG. 6B can be regarded as the projection of the semiconductor layer 314 on the substrate 102.

Continue to refer to FIG. 6A. In accordance with some embodiments, the first scintillator layer 104 may convert lower energy radiation (such as the radiation $X_1$ shown in the figure) into visible light (such as the visible light $L_1$ shown in the figure). In addition, the second scintillator layer 106 can convert the radiation (such as the radiation $X_2$ shown in the figure) that passes through the first scintillator layer 104 without being absorbed by the second scintillator layer 104 due to its high energy into visible light (such as the visible light $L_2$ shown in the figure).

As described above, referring to FIG. 6A and FIG. 6B, in accordance with some embodiments of the present disclosure, the projection 502P of the light-shielding element 502 on the substrate 102 overlaps with the projection 202P of a part of the photosensitive elements 202 (e.g., the photosensitive element 202a) on the substrate 102. That is, a part of the light-sensitive elements 202 may be disposed corresponding to the light-shielding elements 502.

In the above configuration, a part of the photosensitive elements 202 (e.g., the photosensitive element 202b) can simultaneously receive the visible light $L_1$ generated by the conversion of the lower energy radiation $X_1$ through the first scintillator layer 104, and the visible light $L_2$ generated by the conversion of the higher energy radiation $X_2$ through the second scintillator layer 106. The received visible light $L_1$ and visible light $L_2$ can be processed to generate an image converted from the superposition of higher energy radiation signal and lower energy radiation signal. On the other hand, since the light-shielding element 502 shields the visible light $L_1$ that is generated by the conversion of the first scintillator layer 104, a part of the light-sensitive elements 202 (e.g., the light-sensitive element 202a) receive at least the visible light $L_2$ generated by the conversion of higher energy radiation $X_2$ through the second scintillator layer 106. The received visible light $L_2$ can be processed to generate an image converted from the higher energy radiation signal. In some embodiments, a part of the photosensitive elements 202 (e.g., the photosensitive element 202a or the photosensitive element 202b) can further receive the radiation whose energy is in a range overlapping with the ranges of higher energy radiation and lower energy radiation. The subsequent methods of obtaining higher energy images and lower energy images are the same as described above, and thus will not be repeated herein.

Next, refer to FIG. 6C, which is a schematic cross-sectional structure diagram of the radiation-sensing device 40 along the section line D-D' in FIG. 4B in accordance with some other embodiments of the present disclosure. FIG. 6C illustrates a schematic cross-sectional structure diagram of two sets of photosensitive elements 202 (e.g., the photosensitive elements 202b) corresponding to the light-shielding elements 502 in the area $A_4$ shown in FIG. 6A. As shown in FIG. 6C, in some embodiments, the light-shielding element 502 (e.g., the light-shielding element 502a) may be disposed on the insulating structure 204 (e.g., the third insulating layer 406) of the array layer 200. In some embodiments, the light-shielding element 502 (e.g., the light-shielding element 502a) may overlap the driving element 300. In some embodiments, the light-shielding element 502 may be disposed at any position between the light sensitive element 202 and the first scintillator layer 104.

In some embodiments, the light-shielding element 502 may include a material having a light-shielding property. For example, the light-shielding element 502 may be formed of a material having a high reflectivity or a low reflectivity. In some embodiments, the material of the light-shielding element 502 may include a black photoresist or a white photoresist. In some embodiments, the light-shielding element 502 may include an organic resin, a glass paste, other suitable materials, or a combination thereof, but it is not limited thereto.

In addition, in some other embodiments, the material of the light-shielding element 502 may include a conductive material, for example, a metal conductive material. The metal conductive material may include, but is not limited to, copper (Cu), aluminum (Al), tungsten (W), titanium (Ti), gold (Au), platinum (Pt), nickel (Ni), copper alloy, aluminum alloy, tungsten alloy, titanium alloy, gold alloy, platinum alloy, nickel alloy, or a combination thereof. As shown in FIG. 6C, in some embodiments, the bias line BL that is electrically connected to the first electrode 310 may be used as the light-shielding element 502b. In some embodiments, the bias line BL may extend in a direction (for example, the X direction) and overlap the photosensitive element 202 in the normal direction of the substrate 102.

In addition, it should be understood that although the embodiment shown in FIG. 6C includes two types of light-shielding elements (i.e. light-shielding element 502a and light-shielding element 502b) at the same time, in accordance with different embodiments, according to the design requirements, the additional light-shielding element (e.g., light-shielding element 502a) may be used alone, or the bias line BL (e.g., light-shielding element 502b) may be used alone as the light-shielding element, or they may be used in combination.

In some embodiments, the foregoing physical vapor deposition (PVD) process, chemical vapor deposition (CVD) process, coating process, other suitable process, or a combination thereof may be used to form the light-shielding element 502. In addition, in some embodiments, the light-shielding element 502 can be formed by a patterning process.

Figures 7A, 7B, 7C:
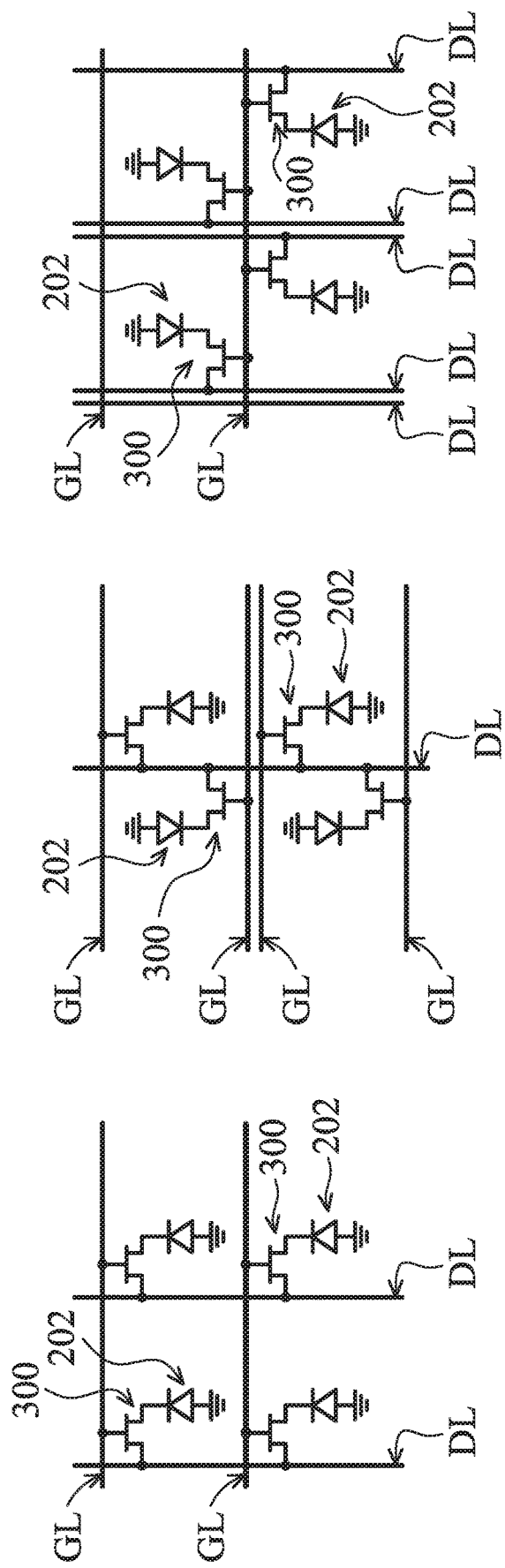
FIGS. 7A to 7C are schematic diagrams of a driving circuit of a radiation-sensing device in accordance with some embodiments of the present disclosure.

Next, refer to FIGS. 7A to 7C, which are schematic diagrams of the driving circuit of the radiation-sensing device in accordance with some embodiments of the present disclosure. As shown in FIG. 7A, in some embodiments, the driving element 300 and the photosensitive element 202 may be controlled using the driving manner of one data line DL and one scanning line GL (1D1G). In some embodiments, an area formed by the intersection of the data lines DL and the scan lines GL may correspond to one pixel region. Furthermore, in some embodiments, the driving element 300 and the photosensitive element 202 may be independently controlled by zones using the driving manner of one data line DL and two scan lines GL (e.g., 1D2G, shown in FIG. 7B) or two data lines DL and one scan line GL (e.g., 2D1G, shown in FIG. 7C). The driving element 300 and the photosensitive element 202 are controlled. In accordance with some embodiments, as shown in FIG. 7B, the arrangement of the data lines DL can be reduced, thereby reducing the manufacturing cost. In accordance with some other embodiments, as shown in FIG. 7C, the arrangement of the scan lines GL can be increased, thereby increasing the signal reading speed.

However, it should be understood that, in the embodiments of the present disclosure, the driving circuit or driving manner of the radiation-sensing device is not limited to those described above. According to the arrangement of the first blocking wall 104A and the first scintillator element 104B or the arrangement of the light-shielding element 502, the suitable driving circuit or driving manner can be adjusted accordingly.

To summarize the above, in accordance with some embodiments of the present disclosure, the provided radiation-sensing device includes the pixelated scintillator layer, the light-shielding element disposed corresponding to a part of the light-sensitive elements, or a combination thereof. Accordingly, in cases where one radiation array panel is used, clear images of high energy and low energy can be obtained at the same time in one radiation irradiation. Compared with the general method of using two radiation array panels, the radiation-sensing device provided in the embodiments of the present disclosure has a single-piece structure, thereby reducing the overall weight of the radiation-sensing device or improving its mechanical strength.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes an individual embodiment, and the claimed scope of the present disclosure also includes the combinations of the claims and embodiments. In addition, each claim constitutes a separate embodiment, and the claimed scope of the present disclosure also includes a combination of each claim and embodiment. The features of the various embodiments can be used in any combination as long as they do not depart from the spirit and scope of the present disclosure. The scope of protection of present disclosure is subject to the definition of the scope of the appended claims.

What is claimed is:

1. A radiation-sensing device, comprising:
   a substrate;
   a first scintillator layer disposed on a first side of the substrate, the first scintillator layer comprising a plurality of first blocking walls and a plurality of first scintillator elements, wherein the plurality of first scintillator elements are located between the plurality of first blocking walls;
   a second scintillator layer disposed on a second side of the substrate, wherein the second side is opposite to the first side; and
   an array layer disposed between the first scintillator layer and the second scintillator layer, wherein the array layer comprises a plurality of photosensitive elements;
   wherein a projection of at least one of the plurality of first blocking walls on the substrate overlaps with a projection of at least one of the plurality of photosensitive elements on the substrate,
   wherein an area of the projection of the at least one of the plurality of first blocking walls on the substrate is greater than or equal to an area of the projection of the at least one of the plurality of photosensitive elements on the substrate,
   wherein the projection of at least one of the plurality of photosensitive elements on the substrate is entirely located in the projection of at least one of the plurality of first blocking walls on the substrate.

2. The radiation-sensing device as claimed in claim 1, wherein a projection of at least one of the plurality of the first scintillator elements on the substrate overlaps with the projection of the at least one of the plurality of photosensitive elements on the substrate.

3. The radiation-sensing device as claimed in claim 1, wherein the at least one of the plurality of photosensitive elements is separated from the first scintillator layer by a first distance, and the at least one of the plurality of photosensitive elements is separated from the second scintillator layer by a second distance, wherein the first distance is less than or equal to the second distance.

4. The radiation-sensing device as claimed in claim 1, wherein the plurality of first blocking walls comprises a reflective material, air, or a combination thereof.

5. The radiation-sensing device as claimed in claim 1, wherein the second scintillator layer comprises a plurality of second blocking walls and a plurality of second scintillator elements, and the plurality of second scintillator elements are located between the plurality of second blocking walls.

6. The radiation-sensing device as claimed in claim 5, wherein a number of the first blocking walls is different from a number of the second blocking walls.

7. The radiation-sensing device as claimed in claim 1, further comprising a reflective layer, wherein the reflective layer and the substrate are respectively disposed on two opposite sides of the second scintillator layer.

8. The radiation-sensing device as claimed in claim 1, wherein the plurality of first blocking walls and the plurality of first scintillator elements are alternately arranged in a row or in a column.

9. A radiation-sensing device, comprising:

a substrate;

a first scintillator layer disposed on a first side of the substrate;

a second scintillator layer disposed on a second side of the substrate, wherein the second side is opposite to the first side;

an array layer disposed between the first scintillator layer and the second scintillator layer, the array layer comprising a plurality of photosensitive elements and at least one light-shielding element;

wherein a projection of the at least one light-shielding element on the substrate overlaps with a projection of at least one of the plurality of photosensitive elements on the substrate, wherein the at least one light-shielding element comprises a conductive material and is electrically connected to the at least one of the photosensitive elements, and the at least one light-shielding element is a bias line.

10. The radiation-sensing device as claimed in claim 9, wherein the at least one light-shielding element is disposed between the first scintillator layer and the at least one of the plurality of photosensitive elements.

11. The radiation-sensing device as claimed in claim 9, wherein the at least one light-shielding element is disposed between the second scintillator layer and the at least one of the plurality of photosensitive elements.

12. The radiation-sensing device as claimed in claim 9, wherein a projection of the at least one light-shielding element on the substrate overlaps with a projection of the at least one of the plurality of photosensitive elements on the substrate.

13. The radiation-sensing device as claimed in claim 12, wherein an area of the projection of the at least one light-shielding element on the substrate is greater than or equal to an area of the projection of the at least one of the plurality of photosensitive elements on the substrate.

14. The radiation-sensing device as claimed in claim 9, wherein the at least one light-shielding element overlaps with a driving element.

* * * * *